United States Patent [19]
Kuga et al.

[11] Patent Number: 4,644,150
[45] Date of Patent: Feb. 17, 1987

[54] APPARATUS FOR INSPECTING CIGARETTE BUNDLES

[75] Inventors: Hisashi Kuga, Nagareyama; Chikara Sasaki, Tokyo, both of Japan

[73] Assignees: Tokyo Automatic Machinery Works, Ltd.; Japan Tobacco Inc., both of Tokyo, Japan

[21] Appl. No.: 644,345

[22] Filed: Aug. 27, 1984

[30] Foreign Application Priority Data

Aug. 31, 1983 [JP] Japan .................................. 58-160941

[51] Int. Cl.$^4$ ........................ G01N 21/55; B07C 5/342
[52] U.S. Cl. .................................. 250/223 R; 209/536; 356/237; 356/448
[58] Field of Search ............... 250/223 R, 216, 223 B; 209/535, 536, 576, 577; 356/445, 448, 237

[56] References Cited

U.S. PATENT DOCUMENTS

| | | | |
|---|---|---|---|
| 4,259,571 | 3/1981 | Dubberly | 250/223 B |
| 4,266,674 | 5/1981 | Bell et al. | 250/223 R |
| 4,486,098 | 12/1984 | Buchegger et al. | 250/223 R |

Primary Examiner—Edward P. Westin
Attorney, Agent, or Firm—Watson Cole Grindle & Watson

[57] ABSTRACT

A novel apparatus is provided for inspecting defects in cigarette bundles layered in buckets which are fixed to a bucket conveyor. The defects include tip fall state where the top content of cigarette piece is dropped off, loss of filter and shortage in the number of cigarette pieces. The apparatus consists of a gate time measuring device, a dark time measuring device, a computing device and a comparison device. The gate time measuring device measures gate time showing the passing time of the internal length of buckets, and the dark time measuring device measures dark time showing the passing time of a defective part of cigarette and of spaces between cigarette pieces. The computing device selects the maximum value of the dark time and computes a percentage of the gate time to the maximum value. The comparison device then compares the computed value with a predetermined value so as to determine whether or not there are defects in cigarette piece bundles.

9 Claims, 7 Drawing Figures

APPARATUS FOR INSPECTING CIGARETTE BUNDLES

BACKGROUND OF THE INVENTION

1. Field of the Invention

The present invention relates to an apparatus for detecting defects in cigarette bundles formed in layered rows in buckets attached to a bucket conveyor for transport through the inspection apparatus. The detected defects include a "tip fail state" in which the top content of a cigarette is missing, lack of the filter and a shortage in the number of cigarettes in a given row.

2. Description of Related Art

In order to examine cigarette bundles conveyed by a bucket conveyor, sensing means are necessary to sense the state of the respective layered rows of bundled cigarettes to output a defect signal. Such sensing means are disclosed in Japanese Examined Utility Model Publication No. 58-5517 by the same applicants as the present application. This publication discloses a photosensitive device consisting of light emitters provided at both sides of each layer of cigarettes lying in buckets, and light receivers, i.e. photoelectric tubes. The phototube senses defects in the cigarettes by detecting the strength of the reflected light received, and issues a defect output signal.

For example, the output signal from the photoelectric tube examining seven cigarettes in a layer of a bundle of cigarettes in a bucket is shown in charts (I) through (IV) of FIG. 5. In FIG. 5, chart (I) shows that a respective row of cigarettes are in a normal condition. In this instance, the phototube output signal remains at a constant voltage level throughout the time the row of cigarettes is examined, namely the length of time for the bucket to traverse the phototube.

Chart (II) shows a state where the tips of two cigarettes are missing. The signal issued by the photoelectric tube is shown as a rectangular pulse in accordance with the defective state of the cigarette tips.

Chart (III) shows a state wherein two cigarettes do not have filters 1b. The signal output of the photoelectric tube is shown in a manner similar as that in chart (II). However, since the filter is longer than the missing content 1a, the voltage signal shown in this chart has a higher level than that of chart (II).

Chart (IV) shows a state wherein a portion of cigarette 1 is short and where a neighboring portion is missing or out of position. Since the length of the defective portion or portions is greatest in charts (I) through (IV), the output signal is also correspondingly the highest. In the Figures, reference numeral 101 indicates a space between cigarettes.

Where a conventional sensing means is used for detecting the signal emitted from the photoelectric tube, the signals disclosed in FIG. 6 are considered. In that Figure, three layers or rows of cigarettes 1 consisting respectively of seven, six and seven cigarettes, are arranged in bucket 2b. The gate time showing the time of passage of the internal length of a cigarette row is detected as gate signals B and C. Only when a defect in a cigarette is found within the time interval shown by signals B and C, i.e. only when a defect output signal D is emitted, is final defect signal E output. The final defect output signal E is used as a signal for eliminating a defective row of cigarettes, or for stopping the bundle conveying operation as is known to those skilled in the cigarette inspection art.

In the normal state, i.e. in the absence of a detected defect, the defect output signal remains at zero volts indicated by signal F. Since no defect output signal is generated in the gate signal B or C, the final defect output signal G is retained at the zero volt level and thus no output signal is generated for eliminating a cigarette bundle, or alternatively stopping the conveyor operation.

In the circumstances illustrated in FIG. 6, it is noted that the bucket 2b has a space so that the cigarettes 1 are not damaged as they are inserted and/or conveyed. Accordingly, the cigarettes 1 in the bucket 2b are moved in a direction opposite to the direction of movement of the bucket in dependence upon the intermittent movement of the bucket 2b. Consequently, irregular spaces shown by the dotted line as signal L of FIG. 7 may occur although the bundles of cigarettes are not in a normal or acceptable state. If the spaces are detected a defective output signal, a final defective output signal would be erroneously emitted and the cigarette bundle concerned would be eliminated from the bucket by means known to those skilled in the art to which the invention pertains.

SUMMARY OF THE INVENTION

The apparatus of the present invention overcomes the aforementioned disadvantages of known cigarette inspecting apparatus. The dark time, showing the passing time of the defective parts of cigarettes, and the passing time of the spaces between each cigarette is measured and detected as a defect output signal. Then a percentage of the gate time to the dark time, or vice-versa, is computed. The computed percentage is compared with a predetermined reference value to determine whether or not there are defects in the rows of cigarettes that are examined. The reference value is the dark time value at the normal state of the cigarette bundle.

The gate time of the upper and lower rows of cigarette layers in the bucket 2b is $T_1$ as shown by signals H, I in FIG. 7, and the gate time of the middle row is $T_2$, and the dark times within the respective gate time are $t_1$, $t_2$, $t_3$, $t_4$, $t_5$ and $t_6$, respectively. The value $T_1$ or $T_2$ is divided by the total value of any one of $t_1$ to $t_6$. If the divided value is the same as or smaller than the reference value, the cigarette bundle is determined to be defective, whereas if the value is greater than the reference value, the bundle is considered to be normal.

The total value of the spaces between the cigarettes is theoretically constant. According to experiments however, the total value of the detected spaces could be greater than is practical as the spaces between cigarettes while the conveyor buckets are moving and stopping could be counted more than once. Therefore, the examination results obtained by the comparison between the reference value and the value obtained by dividing the gate time by the total dark time are sometimes unreliable for detecting defects.

On the basis of the problems of the experimental example mentioned above, the applicants have made the following experiments. That is, we have experimented to determine whether or not there would be a difference between the dark time generated due to several spaces between cigarettes with regard to a normal state and that with regard to a defective situation. The result is that the maximum value of the dark time in a defective state is always greater than that in a normal state.

The present invention takes into consideration hte above-mentioned experimental results with respect to the maximum value of dark time. Therefore, a primary object of the invention is to provide reliable cigarette inspection apparatus wherein cigarette defects are detected accurately on the basis of the correct value to be compared and the situation where a correct or normal state of the cigarettes is present and detected but not correctly indicated is avoided, or a circumstance where cigarette bundle inserting and/or conveying is erroneously stopped is also avoided by the apparatus of the present invention.

The above objects, features and advantages of the invention are accomplished by a cigarette inspecting apparatus comprising a gate time measuring device for measuring gate time which shows the passing time of the interior of a cigarette bucket attached to a bucket conveyor in which a predetermined number of cigarettes are arranged in layered rows, and for issuing a gate signal in response to such measurement. A dark time measuring device is provided with photosensitive means facing the cigarette layers, and measures the dark time showing the passing time of defective cigarettes and of the spaces between the cigarettes to issue a defect output signal. A computing device selects the maximum value of the dark time to compute a percentage of the gate time to that maximum value, or vice-versa, and for emitting the computed value as a detection signal. A comparison and reference device compares the computed value with a predetermined reference value to determine if there is an absence of a cigarette tip, lack of a filter or a shortage in the number of cigarettes, and for emitting an output signal for eliminating the defective cigarette bundle, or a signal for stopping the cigarette bundle inserting and/or conveying operation.

Each of the components of the cigarette inspecting apparatus are described more fully hereinafter. The number of cigarettes in a bundle may be, for example ten or twenty. Where ten cigarettes are used, they are layered in five cigarettes each in respective upper and lower rows or layers. When twenty cigarettes are used, they are layered in three rows of seven, six and seven cigarettes, respectively.

The internal length of the bucket is uniform in the case where the ten cigarettes are used. In the case where twenty cigarettes are layered in the bucket, however, the upper and lower rows or layers each have seven cigarettes, whereas the middle row or layer has six cigarettes. If the internal length of the bucket is not uniform, the gate time measuring device should measure two gate times, one for the longer gate and the other for the shorter gate, and emit two output signals.

The gate time measuring device is required to convert the measured values into electrical gate signals. Therefor, a rotary encoder is employed to detect the amount of rotation of the drive shaft of the bucket which corresponds to the amount of movement of the bucket.

The dark time measuring device should have a pair of photosensitive means for simultaneously sensing the tip end and bottom ends of the cigarettes. The sensitive means is also preferred to be provided with a light emitter for emitting modulated light via an oscillator so that the light may be uneffected by ambient light. A light receiver consisting of photoelectric receptors for receiving the light from the light emitter and to issue a modulated pulse output in response thereto.

The computing device selects the maximum value of the dark time and computes the percentage of the gate time to the maximum value, or vice-versa, in the following manner. The defect output signal, i.e. the measured amount of the dark time, is counted by the device on the basis of a reference time, and the maximum value of the dark time is selected by a comparison of the counted numbers. The gate signal which is input into the comparison device is counted on the basis of the reference time, and the counted number is input to the computing device, and the counted number of the gate signal is divided by the counted number of the maximum value of the dark time. Thus, the percentage of the gate time to the maximum value of the dark time is computed.

The reference value of the comparison and determining device is the one obtained by dividing the gate time by the maximum value of the dark time of a normal cigarette bundle, and by multiplying the resulting value by an allowable percentage. The allowable percentage is, of course, a value less than 1.0.

The determination device operates in the following manner. If the value computed by the computing device is set as X and the reference value as A, then it is determined that the cigarette bundle is in a normal state if there exists the following relationship:

$$A < X$$

It is determined that a cigarette bundle is defective if there exists the following relationship:

$$A \geq X$$

The determined result of the above relationships is reversed if the computed value and the determined value are obtained by dividing the dark time by the gate time.

According to the present invention, the determination as to whether or not there are defects in cigarette bundles is carried out by computing a percentage of gate time to the maximum value of the dark time, and by comparing the computed value with a reference value. Thus, according to the invention, the value to be compared to the reference value is correctly obtained, such that defects in cigarette bundles are accurately determined. Consequently, there is no such a situation where normal cigarette bundles are erroneously eliminated or detected, or a situation where the insertion of normal cigarette bundles or the conveying operation is erroneously stopped. Thus, the apparatus of the present invention is reliable in detecting defects in cigarette bundles.

BRIEF DESCRIPTION OF THE DRAWINGS

The above objects, features and advantages of the apparataus of the invention are more clearly understood from the following description of a preferred embodiment of the best mode of carrying out the invention with reference to the accompanying drawings, wherein.

DETAILED DESCRIPTION OF THE PREFERRED EMBODIMENT

Figure 1:
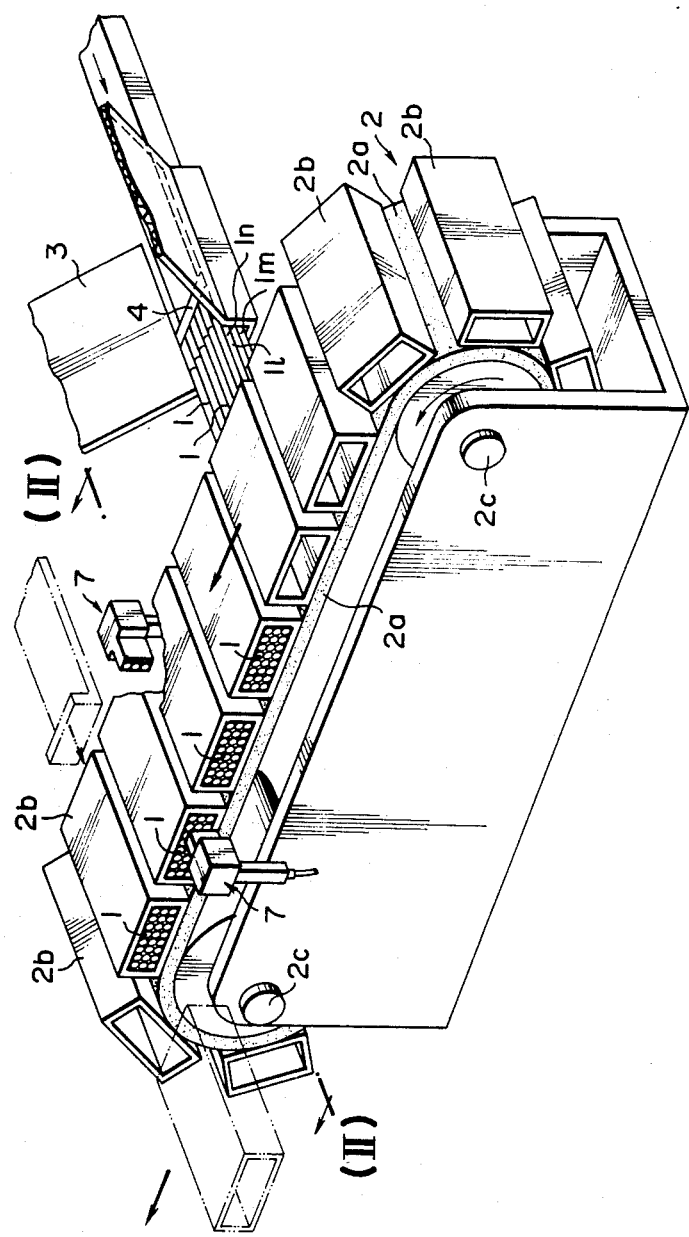
FIG. 1 is a perspective view of a partially removed portion of the detection apparatus in accordance with the invention.
Figure 3:
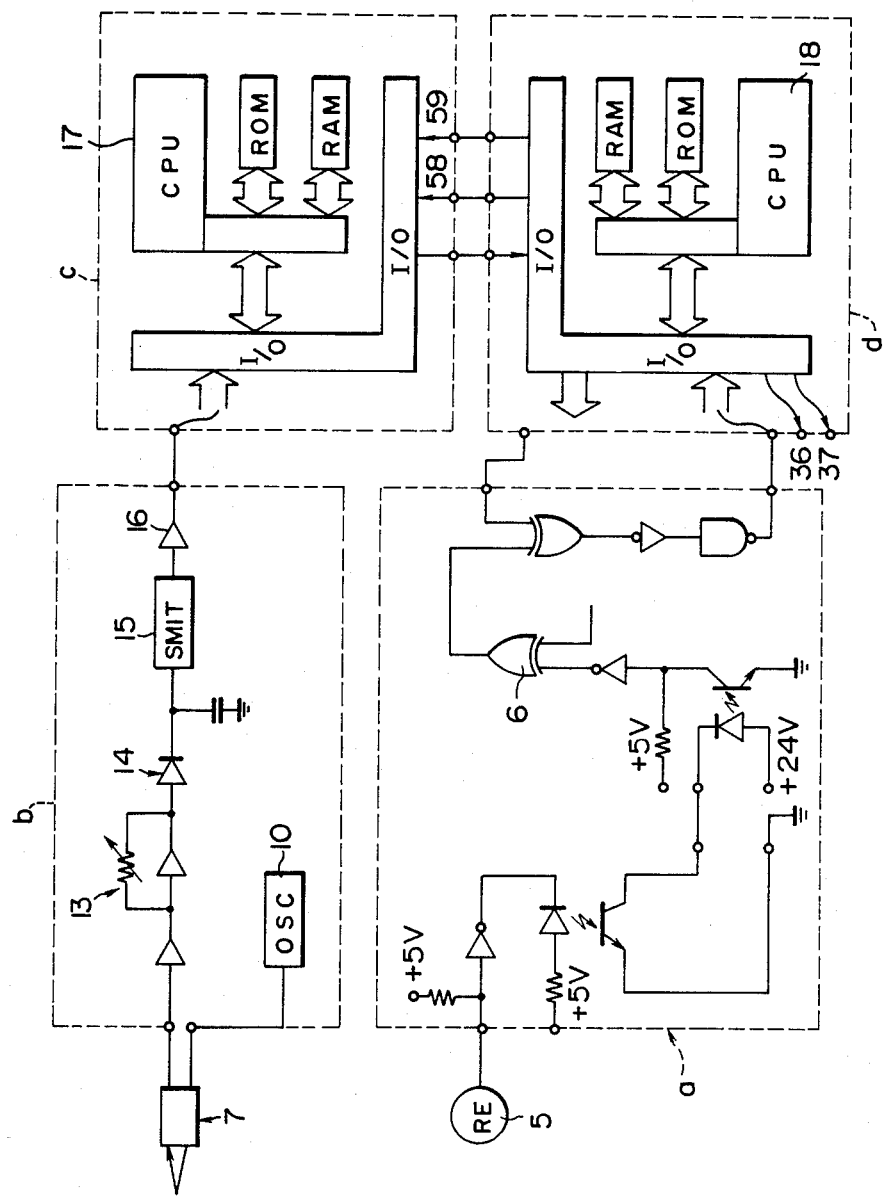
FIG. 3 is a circuit diagram of the measuring and computing devices of the invention.

A preferred embodiment of the inspection apparatus of the invention is illustrated in FIGS. 1 and 3. The apparatus inspects cigarettes and detects defects in bundles of cigarettes conveyed by a bucket conveyor 2, and is provided with a gate time measuring device a, a dark time measuring device b, a computing device c and a comparison and reference device d.

The bucket conveyor 2 consists of a belt 2a driven by shafts 2c, and a number of spaced buckets 2b mounted on belt 2a with opened sides of the buckets facing as illustrated in FIG. 1. Cigarette bundles are housed in buckets 2b and are conveyed intermittently to enable the contents of each bucket to be inspected at an inspection station 7. Cigarettes 1 are inserted into bucket 2b by a hopper 3 and a pusher element 4. Three layers of cigarettes, each respectively having seven, six and seven cigarettes, are placed in lower, middle and upper layers or rows $1_l$, $1_m$ and $1_n$ on hopper 3. The layered cigarettes 1 are urged by pusher element 4 into bucket 2b.

With respect to FIG. 3, the gate time measuring device measures a gate time representing the passing time of the internal length of the bucket 2b and outputs a gate signal representative thereof. The gate time measuring device includes a rotary encoder 5 which detects the amount of rotation of drive shaft 2c of the bucket conveyor 2, such movement corresponding to the amount of movement of bucket 2b, and converts the rotated amount into electrical signals, i.e the gate signals illustrated as I, II, III and IV of FIG. 4.

The gate signal output from rotary encoder 5 is 5V, which is converted to 24V to be detected from noise in a manner known to those skilled in the art to which this invention pertains. The output is finally converted to 5V, and is input into comparison device d via a signal data converter 6.

Thus, when the gate signal output coincides with the set value output from a memory of the comparison and reference device d, signals 50, 52, 54 and 56 (FIG. 4) initially are input to comparison device d. Similarly, signals 51, 53, 55 and 57 at the termination stage also are input into comparison device d. then the time interval from the start 56 to the last signal 57, i.e. the gate time T, is counted by comparison device d on the basis of reference time $t_o$ and the result is stored. The counted number N is shown by the following formula:

$$N = T/t_o$$

The gate time T includes long and short gate times, as mentioned previously. The count representing each value are sent to the computing device c as signals 58 and 59 as shown in FIG. 3.

Figure 2:
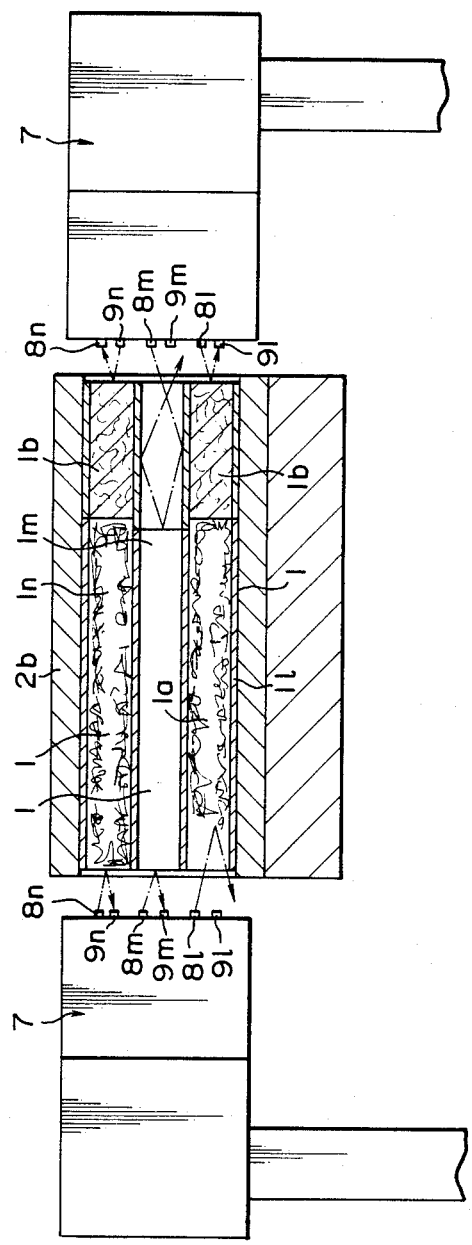
FIG. 2 is an enlarged sectional view of the apparatus taken along the lines II—II of FIG. 1.

The dark time measuring device b measures the passing time interval of defective cigarette parts 1 and of the spaces between adjacent cigarettes, and outputs a defect signal. The device is provided with a pair of photosensitive means at an inspection station 7, and as shown in FIG. 2, the photosensitive means includes light emitters $8_l$, $8_m$ and $8_n$ and light receivers, i.e. photosensitive devices $9_l$, $9_m$ and $9_n$, each of which confronts cigarette layers $1_l$, $1_M$ and $1_n$, respectively of the cigarettes housed in buckets 2b.

Figure 4:
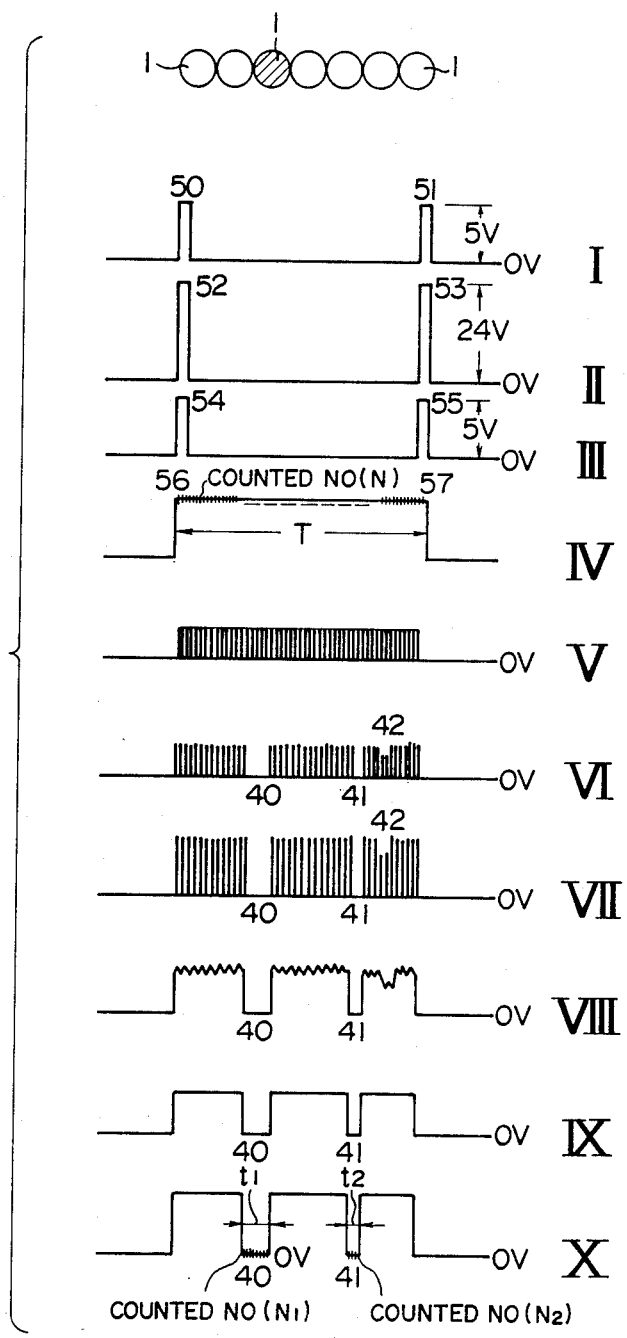
FIG. 4 shows various signals in the apparatus of the invention.
Figure 5:
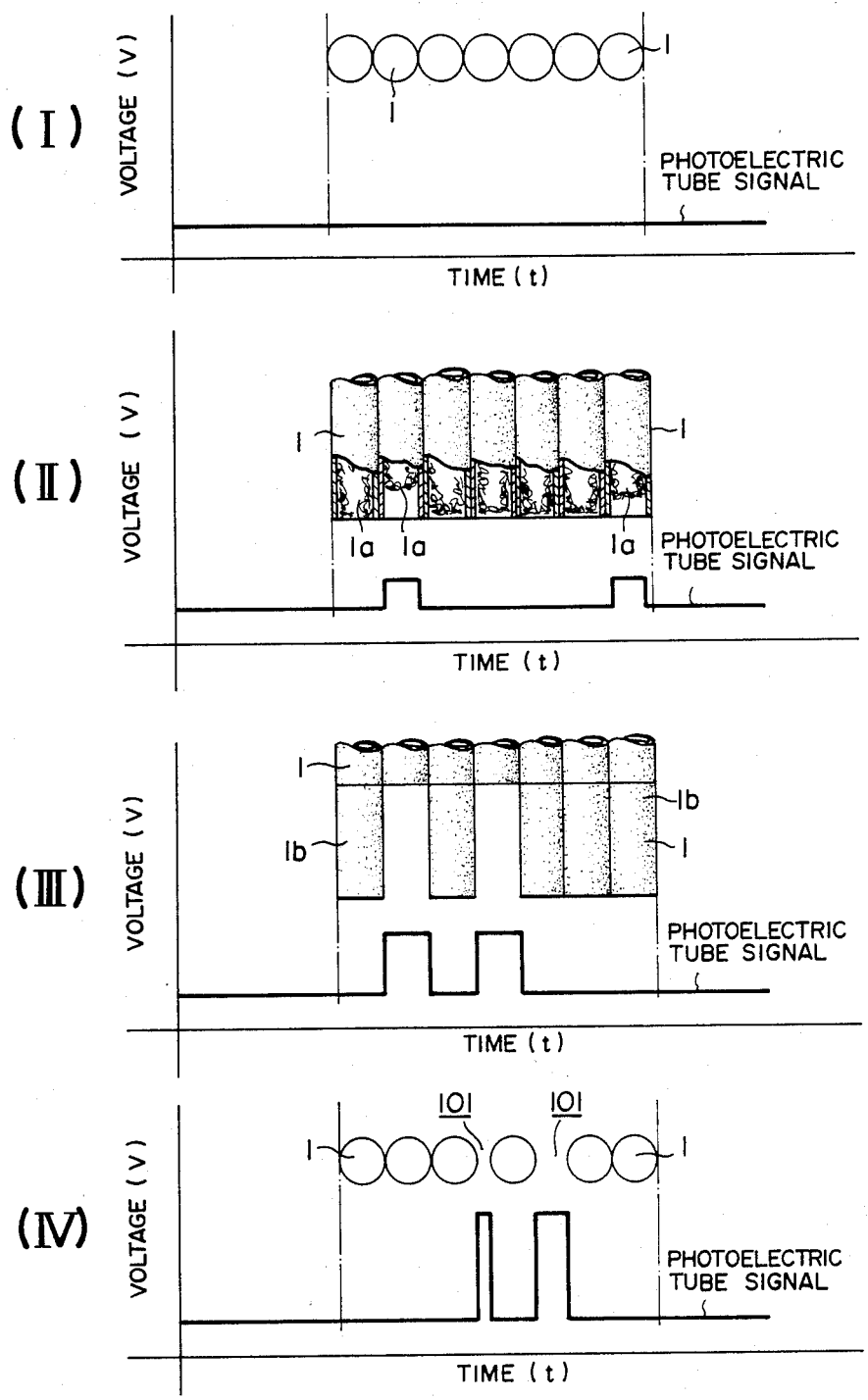
FIG. 5 represents various waveforms of the sensing device in accordance with normal cigarette bundles and various defective states of the cigarette bundles.
Figure 6:
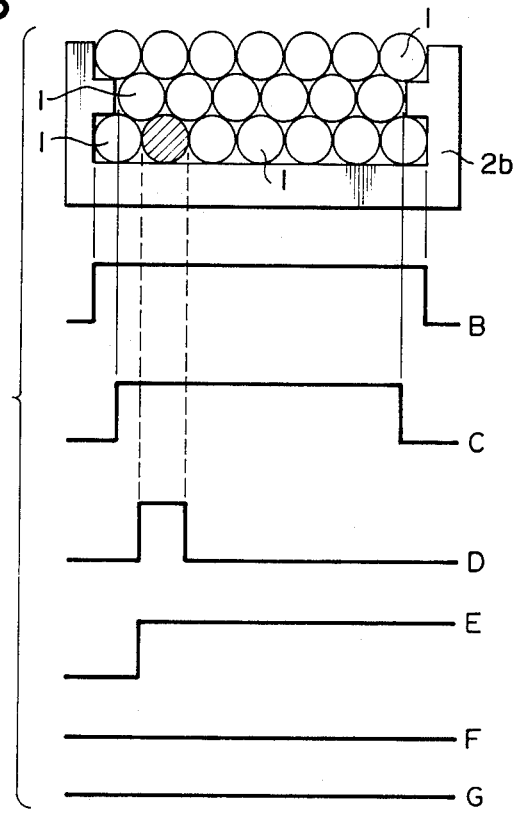
FIG. 6 shows various signals in the apparatus to generate a defect output signal.
Figure 7:
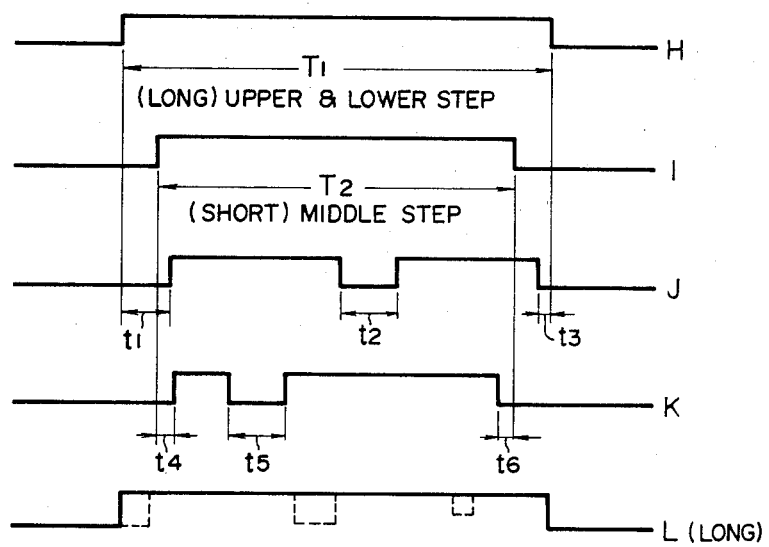
FIG. 7 illustrates various signals generated in the apparatus of the invention.

Light emitted from light emitters $8_l$, $8_m$ and $8_n$ are converted by an oscillator 10 (FIG. 3) to modulated light to prevent disturbance by ambient light. When photoelectric sensors $9_l$, $9_m$ and $9_n$ uniformly receive reflected light, they output modulated pulses as shown by V in FIG. 4. If a cigarette is missing from a layer as indicated by the crosshatching in the upper portion of FIG. 4, the modulated pulse shown in VI of FIG. 4 is emitted from the photosensors. Such modulated pulses are indicated by gaps 40, 41 and 42 in VI and VII of FIG. 4. The modulated pulses shown in VI of FIG. 4 are amplified by parallel current amplifier 13 of FIG. 3 a shown by VII in FIG. 4. The gaps 40, 41 and 42 are smoothed by pulse smoothing circuit 14 as shown in VIII, and shaped by wave former 15 to have the form as shown by IX in FIG. 4. The wave signal is then amplified as shown by X and input into computing device c via inverter 16. The inverted output signal from inverter 16 is a defect output signal, and the initial time of signal X means dark time $t_1$ and $t_2$. Dark times $t_1$, $t_2$ are inspected and counted by computing device c on the basis of reference time $t_o$ and stored. In this instance if there are two or more initial times, each initial time is counted independently and stored separately in a memory RAM of computing device c. The counted number $N_1$ of the dark times is represented by the following formulae:

$$N_1 = t_1/t_o$$

$$N_2 = t_2/t_o$$

The computing device c selects the maximum value of dark time measured by the dark time computing device b after comparison of counted numbers $N_1$, $N_2$ and divides the percentage of gate time T by the maximum dark time total of the counted numbers. The computed value is output as a detection signal. Computing device c is provided with a central processing unit 17.

The comparison and reference device d compares the computed value output from computing device c to a predetermined reference value stored in memory RAM, and determines a defective state of the cigarette bundles. The result is a signal output for eliminating the defective bundle or for stopping the insertion of cigarettes and the conveying operation. The comparison and reference device d is provided with a central processing unit 18.

In the cigarette inspection apparatus described above, the various steps of inspection of the cigarette bundles as shown in FIG. 4 are carried out in the following manner. In the computing device c, $t_1$ is selected as the maximum dark time, and a percentage of gate time T to the maximum value $t_1$ is computed as a percentage of the counted number $N_1$ in respective time as follows:

$$N/N_1 = T/t_1 = X$$

The percentage, i.e. the computed value X, is compared to determine value A by the comparison device d. If the comparison indicates that A X, that is if the value of X is greater than A, the cigarette bundle is in a normal state and is satisfactory.

However, if the value of X is smaller than, or equal to, A, i.e. A X, it is determined thereby that there is a missing cigarette tip or a piece of filter missing. If both tip loss and filter loss occur simultaneously, it is then determined that there is a shortage in the number of cigarettes.

After a defective state is determined as described above, elimination signal 36 or stop signal 37 are output from comparison device d so that a mechanical operation for eliminating the cigarette bundle or for stopping the bucket conveyor 2 and pusher member 4 can be carried out.

It is to be understood by those skilled in the cigarette inspection art that the above description is only of a preferred embodiment and that various changes and modifications may be made without departing from the scope of the invention as reflected by the accompanying claims.

What is claimed is:

1. An apparatus for inspecting cigarette bundles, comprising:
    gate time measuring means for measuring the passing time of the internal width of buckets fixed to a belt conveyor in which a predetermined number of cigarettes are layered in rows, and for issuing a gate signal representative of said width;
    dark time measuring means including photoelectric means facing each said row of cigarettes, and which measures the dark time representing the passing time of defective cigarette parts and of spaces between neighboring cigarettes, and issues a defective output signal in response thereto;
    computing means responsive to said defect output signals for selecting the maximum value of dark times for each said row of cigarettes, and computing a ratio of said gate time and maximum value and issuing the computed value as a detection signal; and
    comparison means for comparing said computed value with a predetermined reference value so as to determine a defect in any one of said rows of cigarettes, and for issuing an output signal representative thereof.

2. An apparataus according to claim 1, wherein 7, 6 and 7 cigarettes are layered in upper, middle and lower rows, respectively.

3. An apparatus according to claim 2, wherein said gate time measuring means measures long and short gate time in compliance with the difference in the internal length of each of said rows so as to issue corresponding gate signals.

4. An apparatus according to claim 3, wherein said gate time measuring means includes an encoder which detects movement of the bucket conveyor.

5. An apparatus according to claim 1, wherein said photosensitive means includes two photodetectors provided in a manner facing both sides of said cigarette rows.

6. An apparatus according to claim 5, wherein said dark time measuring means further includes an emitter for emitting modulated light via an oscillator, and of a light receiver consisting of photoelectric tubes for receiving the light and for issuing said defect output signal as a modulated pulse.

7. An apparatus according to claim 1, wherein said comparison means receives said gate signal, counts the pulses within said gate signal on the basis of reference time, and issues the counted number to said computing means enabling count of the measured value of dark time on the basis of the reference time, said comparison means also selects the maximum value of dark time by the comparison of the counted numbers, and computes a percentage of gate time to maximum value of dark time by dividing the counted number of said gate signal by the counted number of the maximum value, and wherein the defect signal is determined by the value obtained by dividing gate time by maximum dark time generated by normal cigarettes and by multiplying the divided value by an allowed percentage.

8. An apparatus according to claim 7, wherein, if the counted number of the gate signal is set as N, the counted number of maximum dark time as $N_1$, and the value computed by said computing device means as X, the computed value X is represented by:

$$X = N/N_1$$

and if the predetermined value to be compared by the computed value X is set as A, then, it is determined that the rows of cigarettes are in a normal state if there exists the following relationship:

$$A < X$$

and it is determined that at least one cigarette row is defective if there exists the following relationship:

$$A \geq X.$$

9. An apparatus according to claim 2, wherein said predetermined value is equal to the value obtained by dividing said gate signal by a maximum dark time representative of several empty spaces with respect to normal rows of cigarettes and by multiplying that divided value by an allowable percentage.

* * * * *